(12) United States Patent
Gortych et al.

(10) Patent No.: US 10,784,755 B2
(45) Date of Patent: Sep. 22, 2020

(54) STATOR BAR MOLD INSERT

(71) Applicant: General Electric Company, Schenectady, NY (US)

(72) Inventors: Tomasz Gortych, Wroclaw (PL); Adam Roznowski, Wroclaw (PL)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 16/014,373

(22) Filed: Jun. 21, 2018

(65) Prior Publication Data
US 2018/0375412 A1    Dec. 27, 2018

(30) Foreign Application Priority Data
Jun. 22, 2017    (EP) ..................... 17177437

(51) Int. Cl.
| H02K 15/12 | (2006.01) |
|---|---|
| H02K 3/30 | (2006.01) |
| H02K 3/40 | (2006.01) |
| H02K 3/52 | (2006.01) |
| H02K 15/02 | (2006.01) |
| H02K 3/34 | (2006.01) |

(52) U.S. Cl.
CPC ............... *H02K 15/12* (2013.01); *H02K 3/30* (2013.01); *H02K 3/40* (2013.01); *H02K 3/521* (2013.01); *H02K 15/02* (2013.01); *H02K 3/34* (2013.01)

(58) Field of Classification Search
CPC .......... H02K 15/12; H02K 15/02; H02K 3/30; H02K 3/34; H02K 3/40; H02K 3/521
See application file for complete search history.

(56) References Cited

U.S. PATENT DOCUMENTS

| 9,032,618 B2 | 5/2015 | Baumann |
|---|---|---|
| 2010/0314021 A1 | 12/2010 | Safari Zadeh |

FOREIGN PATENT DOCUMENTS

| CN | 101599676 A | 12/2009 | |
|---|---|---|---|
| CN | 103944326 A | 4/2014 | |
| CN | 104218749 A | 12/2014 | |
| EP | 0602907 A1 | 6/1994 | |
| EP | 0978929 A2 | 2/2000 | |
| EP | 3148059 A1 | 3/2017 | |
| SU | 1746852 A1 | 7/1992 | |
| WO | WO-2010100079 A1 * | 9/2010 | ............ H02K 15/12 |

OTHER PUBLICATIONS

A. Bock et al., "Trends in Insulation Systems for Generator HV-Windings", Session 2002 CIGRE, 11-102, 4 pages, Paris, France.
European Patent Office, Extended European Search Report for application No. EP17177437.5, dated Feb. 18, 2018.
European Patent Office, Communication_Under_Rule_71(3) for application No. EP17177437.5, dated Aug. 26, 2019.

* cited by examiner

*Primary Examiner* — Jue Zhang
(74) *Attorney, Agent, or Firm* — James W. Pemrick; Charlotte C. Wilson

(57) ABSTRACT

A stator bar mold insert includes an upper portion and a lower portion. A central cavity is disposed between, and defined by, the upper portion and the lower portion. The central cavity is configured for use with a stator bar. A low friction material lines the central cavity, and the low friction material substantially surrounds the stator bar located inside the stator bar mold insert.

19 Claims, 5 Drawing Sheets

STATOR BAR MOLD INSERT

BACKGROUND OF THE INVENTION

The apparatus described herein relates generally to stator bars and, more specifically, to a stator bar mold insert having low friction inlays in the lug area of the stator bar.

Most alternating current dynamoelectric machines require windings to be inserted into a slotted magnetic stator structure to produce a rotating magnetic field and most multiphase machines are manufactured so that the two sides of any given bar are placed in two different slots in the stator of the generator. For large generators, it is necessary to insert a series of bars into the bottom of the stator core slots and subsequently insert a second set of stator bars (having a different geometry from the first set) into the tops of the core slots. When the stator bars are satisfactorily placed in the stator core, the bars are wedged into place by means of slot wedges, or some other appropriate fastening technique. Because the bars are inserted into the stator in two pieces, it is necessary to join the bar ends (i.e., the lugs) to complete the winding circuitry. This technique has usually involved brazing the two ends of the bars together using some sort of connector device. When brazing, the surfaces of the region to be joined should be clean, and without mechanical damage (e.g., non-flat areas, bends, recesses, scratches, etc.).

Experience with the brazing process shows that completely sound brazes are difficult to achieve because of the large surface area, and because of an inability to feed braze alloy into the joint during solidification. Consequently, porosity can occur in joints or at the joint surface which may result in rework or scrapping of the stator bars, and which may also create conditions for subsequent corrosion and/or erosion during service. Furthermore, excess resin from an impregnation process may accumulate on the stator bar ends, and this excess resin must be removed before brazing and may also complicate stator bar removal from the resin mold. Removal of stator bars from the mold may cause damage to the mold or the stator bar itself, and either one is undesirable as it creates manufacturing delays and added cost.

BRIEF DESCRIPTION OF THE INVENTION

According to an aspect, a stator bar mold insert includes an upper portion and a lower portion. A central cavity is disposed between, and defined by, the upper portion and the lower portion. The central cavity is configured for use with a stator bar. A low friction material lines the central cavity, and the low friction material substantially surrounds the stator bar located inside the stator bar mold insert.

According to another aspect, a stator bar mold insert includes an upper portion comprised of a generally L-shaped body, and a lower portion comprised of a second generally L-shaped body. A central cavity is disposed between and defined by the upper portion and the lower portion. The central cavity is configured for use with a stator bar. An inside surface of the upper portion's L-shaped body faces towards the central cavity, and an inside surface of the lower portion's L-shaped body faces towards the central cavity. A low friction material lines the central cavity. The low friction material is attached to the inside surface of the upper portion, and at least a portion of the low friction material is attached to the inside surface of the lower portion. The low friction material substantially surrounds the stator bar located inside the stator bar mold insert.

According to yet another aspect, a stator bar mold insert includes an upper portion comprised of a generally L-shaped body. An inside surface of the L-shaped body faces towards a central cavity. A lower portion is comprised of a second generally L-shaped body, and an inside surface of the second generally L-shaped body faces towards the central cavity. The central cavity is disposed between, and is defined by, the upper portion and the lower portion. The central cavity houses a portion of a stator bar. A low friction material lines the central cavity, and the low friction material substantially surrounds the stator bar located inside the stator bar mold insert. The low friction material is comprised of polytetrafluoroethylene or a synthetic fluoropolymer of tetrafluoroethylene.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
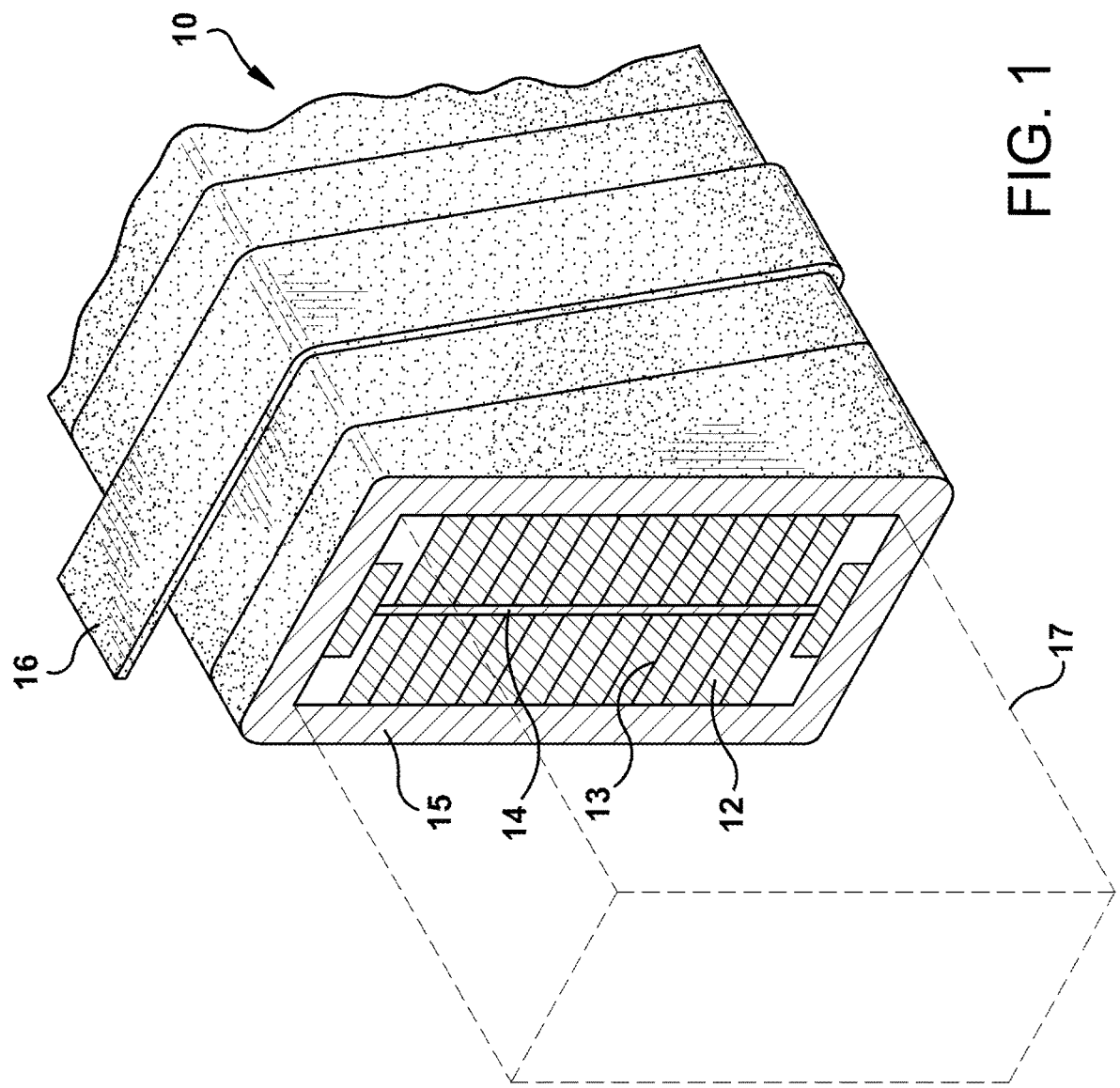
FIG. 1 illustrates an end portion of a stator (armature) bar of the type installed in dynamoelectric machines.

FIG. 1 illustrates an end portion of a stator (armature) bar 10 of the type installed in dynamoelectric machines, such as a generator used in power generation of high-voltage alternating current. The stator bar 10 can be manufactured to have essentially any length, shape and cross section appropriate for a given generator design, voltage, and power. For most high-voltage applications, the stator bar 10 will not have a simple linear shape, but instead will have a complex shape with bends and turns.

As shown, the stator bar 10 is composed of a number of conducting copper strands 12 that are insulated from each other by strand insulation 13. The strands 12 are arranged to form two tiers that are separated by a strand separator 14, all of which may together be termed a "bare bar." Surrounding the tiers is a stator bar (groundwall) insulation 15 formed by multiple wrappings of a mica paper tape 16. Typically, multiple layers of tape are tightly wrapped around the conductor, usually overlapping by one-half the width of the tape, or "half-lapped." The groundwall insulation 15 serves to insulate the stator bar 10 from the stator in which it is installed.

Groundwall insulation of the type shown in FIG. 1 is widely used in the power generation industry. The tape 16 is a prepreg composed of a mica paper typically backed by a single woven backing or a pair of backings. A resin composition permeates the mica paper and bonds each backing to the mica paper, thereby forming the prepreg tape. The stator bar 10 is placed in an autoclave for vacuum heat treatment and subsequent curing of its tape 16. Vacuum heat treatment is carried out to remove air, moisture and any solvent or volatile compound present in the resin binder of the tape 16 while curing under pressure serves to consolidate the tape insulation, such that the resin binder bonds the mica paper and each of its backings together to form a void-free solid insulation. Removal of air, moisture, solvents and volatile compounds from the binder is necessary to prevent formation of voids in the cured insulation that would otherwise adversely affect the quality of the insulation and induce premature insulation failure due to breakdown under electrical stress. The latter characteristic of insulation is termed "voltage endurance," and is normally due to erosion by electrical discharge and electrochemical attack. Two suitable methods for impregnating the resin are vacuum pressure impregnation (VPI) and tube vacuum pressure impregnation (TVPI). TVPI is preferred as less resin is required for both resin impregnation and on-site storage of the resin. With TVPI, only the amount of resin needed to impregnate the mica taping of an individual bar is required. Since the bar is injected with resin in its closed mold or pressing form, no additional resin is necessary for flooding the bars. The result is much less resin is used during the vacuum impregnation (compared to VPI) and only a small amount of resin needs to be stored on site (compared to VPI).

After the impregnation process is complete in TVPI, the stator bar must be removed from the mold or pressing form. This removal is a critical stage, because the stator bars may be damaged during removal. Molds are typically coated with a release agent, but this is rarely 100% effective and the stator bar can become "stuck" to the mold. When this happens the stator bar must be pried out or be manipulated until the stator bar is loose enough to be removed. This prying or manipulation is an opportunity for stator bar damage to occur, as the stator bar or lug end can be mechanically damaged (e.g., gouged, scratched, bent, etc.). Additional risks are posed for stator bars with internal liquid cooling channels or bars with complicated shapes, as these bars and especially the ends of these bars are more fragile than non-liquid cooled stator bars.

The ends of the stator bar 10 are called the lugs 17 (or bar ends) and are usually free of insulation as they are brazed (or soldered) to other lugs (bar ends) of different stator bars or to connectors used to connect two stator bars (or bars with another pair of generator phase stator bars). It would be advantageous to minimize resin accumulation in these areas, as any resin would need to be removed prior to a joining operation (e.g., brazing or soldering). Any damage or shape deviations between the brazed surfaces can affect joint quality. Lugs may have a variety of shapes, depending on the specific generator, and functional features (e.g., water cooling channels). The central section of stator bars will typically vary less in shape and configuration, than the bar ends or lugs. It would be advantageous to have an easily replaceable mold for the lug section of the stator bars.

Figure 2:
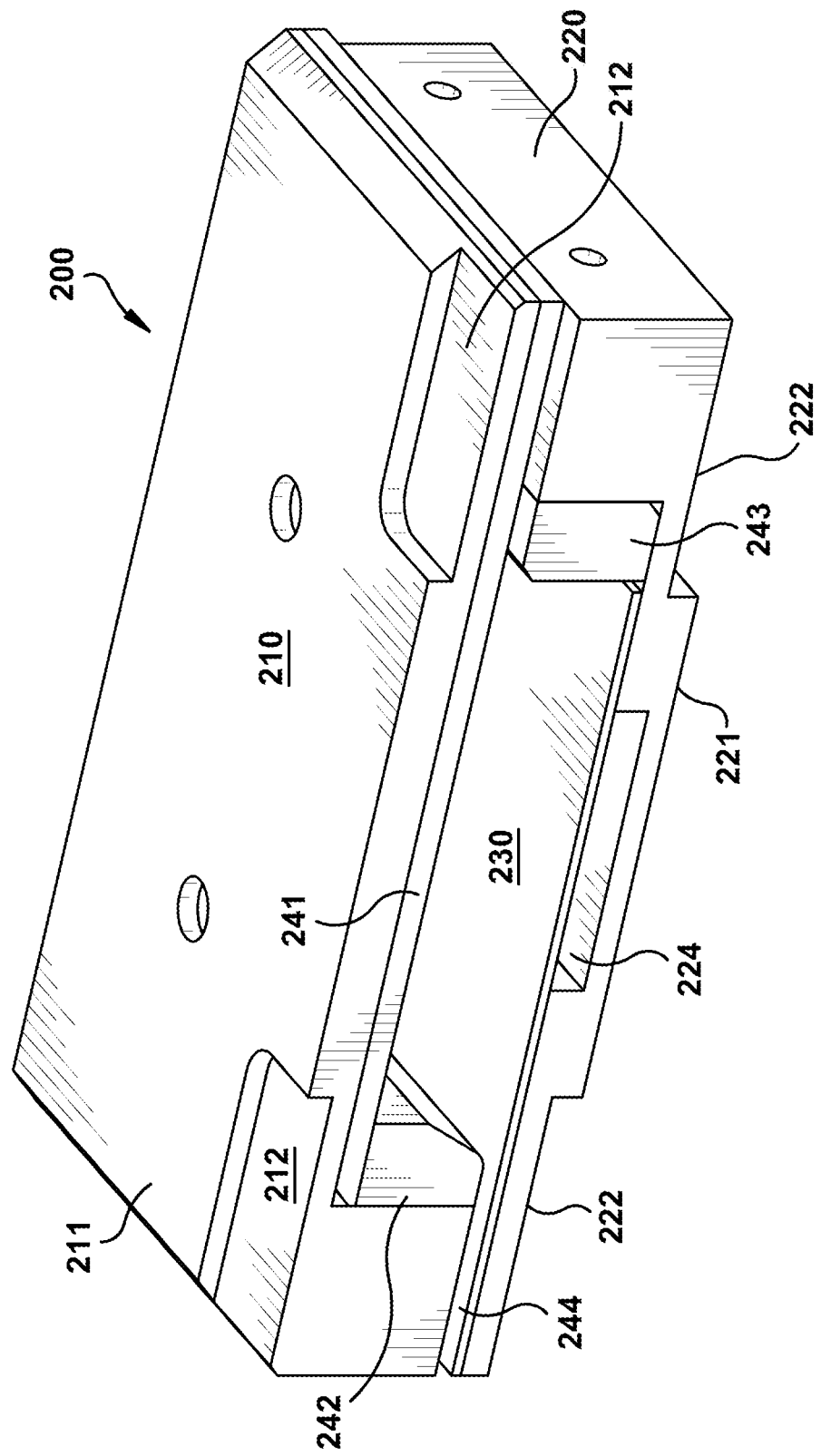
FIG. 2 illustrates a top perspective view of a stator bar mold insert, according to an aspect of the disclosure.

FIG. 2 illustrates a top perspective view of a stator bar mold insert 200, according to an aspect of the disclosure. The stator bar mold insert 200 includes an upper portion 210 and a lower portion 220. A central cavity 230 is disposed between, and defined by, the upper portion 210 and lower portion 220. The central cavity 230 is configured for use with a stator bar 10, and specifically the lug 17 of the stator bar. A low friction material lines the central cavity 230, and is configured to substantially surround the stator bar (i.e., the lug 17) located inside the stator bar mold insert. The low friction material includes layers 241 and 242, where layer 241 is attached to a bottom (and interior facing) surface of upper portion 210 and layer 242 is attached to a side (and interior facing) surface of upper portion 210. As may be seen, the upper portion is a generally L-shaped body with the low friction material 241, 242 attached to the inside of the "L". The term "generally is defined as, "with respect to the larger part, or for the most part". The inside surfaces of the upper 210 and lower 220 portions generally face towards the cavity 230, or at least towards the opposing portion. The low friction material layers 241, 242 may be attached to the upper portion by fasteners or adhesive.

The low friction material layer also includes layers 243 and 244, where layer 244 is placed on a top (and interior facing or inside) surface of lower portion 220, and layer 243 is attached to a side (and interior facing or inside) surface of lower portion 220. As may be seen, the lower portion 220 is also a generally L-shaped body with the low friction material 243, 244 attached to or placed on the inside of the "L". Low friction material layer 243 may be attached to the lower portion 220 by fasteners or adhesive. Low friction material layer 244 is preferably not attached to lower portion 220, but rather lies on the inside surface to facilitate removal of the layer 244 and the stator bar lug.

The low friction material layers (or pieces) cover substantially the entire inside surface of the respective mold portion. For example, layers 241 and 242 cover substantially the entire inside surface of the upper portion 210, and layers 243 and 244 cover substantially the entire inside surface of the lower portion 220. The low friction material layers may be comprised of polytetrafluoroethylene (PTFE) or a synthetic fluoropolymer of tetrafluoroethylene, and one readily available product is known by the trademarked name of Teflon®, (a registered trademark and a brand name owned by Chemours). The low friction material layers can be configured to closely conform to any of a variety of lug shapes and to ensure safe removal of the lugs from the mold or mold insert, as desired in the specific application.

The upper portion 210 includes at least one recess 212 (two are shown) located on an outside surface 211 of the L-shaped body. The recess 212 facilitates removal of the stator bar mold insert 200. The stator bar mold insert 200 is placed inside a larger stator bar mold (not shown in FIG. 2), and after the TVPI process is complete the recess 212 may be used with a tool to break free or disengage the insert 200 from the surrounding mold. The lower portion also includes at least one recess 222 (two of which are shown) located on an outside surface 221 of the L-shaped body. The recess 222 facilitates removal of the stator bar mold insert 200 from the stator bar mold. The lower portion 220 also includes a recess 224 formed in (or on) the inside surface facing towards central cavity 230. The low friction material layer 244 is placed over recess 224, and recess 224 facilitates removal of the stator bar 17 and layer 244 from the stator bar mold insert. For example, a pry tool may be inserted into recess 224 under layer 244, and then by manipulation of the pry tool the stator bar lug and layer 244 may be disengaged (or removed) from lower portion 220. Layer 244 is important because it facilitates stator bar removal and makes it safer for the lug areas (by reducing or eliminating damage to these areas).

Figure 3:
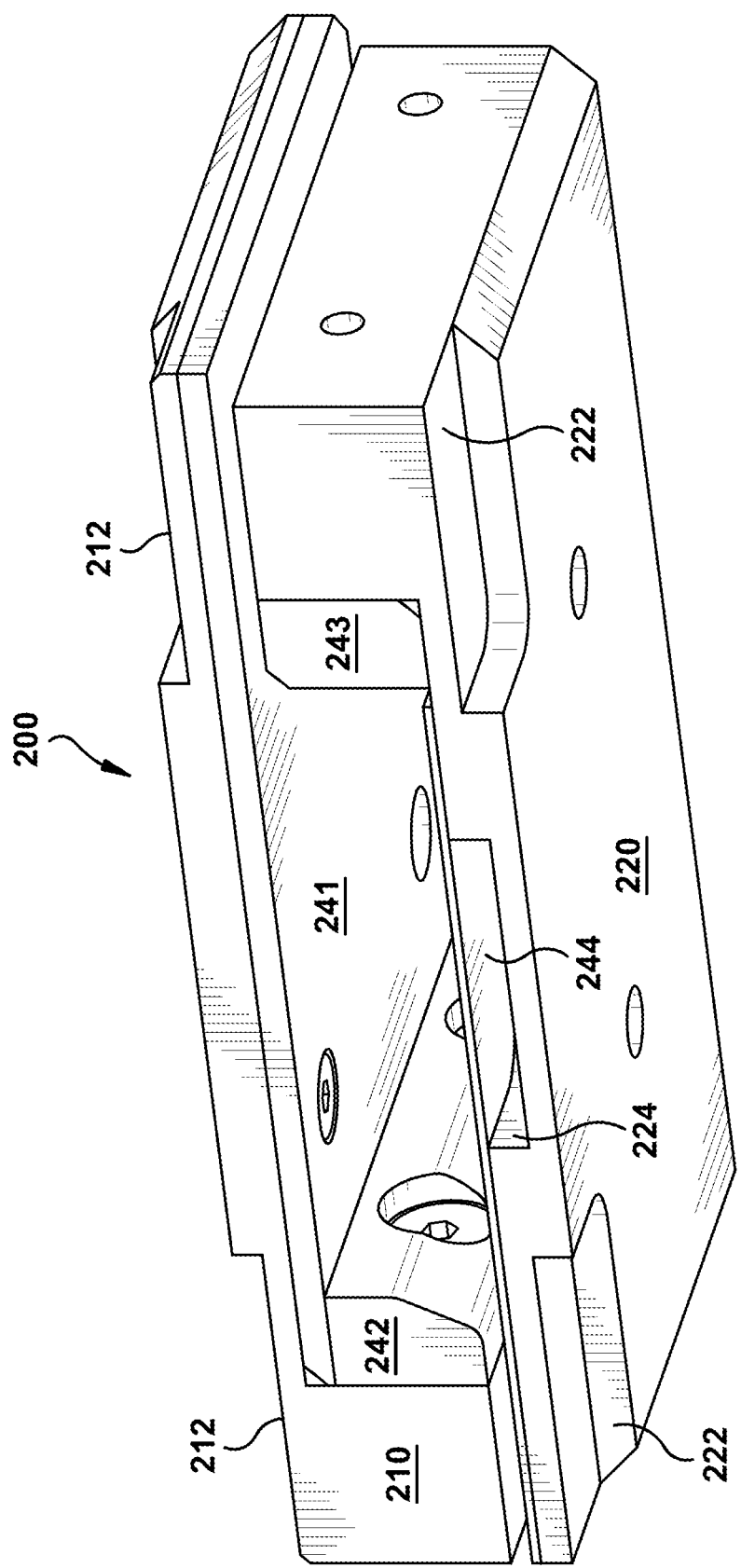
FIG. 3 illustrates a bottom perspective view of the stator bar mold insert, according to an aspect of the disclosure.

FIG. 3 illustrates a bottom perspective view of the stator bar mold insert 200, according to an aspect of the disclosure. The stator bar lug 17 is omitted for clarity. The low friction material layers 241, 242, 243 are mechanically fastened to the mold insert, but may be removed by removal of the fasteners securing layers 241-243. This may be desired if the layers 241-243 become damaged after repeated uses of mold insert 200. Layer 244 is simply laid in place (without fasteners) and is easily removed by lifting (or prying) up via recess 244. The stator bar mold insert 200 is typically only completely removed from the mold in case a stator bar with a different geometry is undergoing a VPI or TVPI process. In normal use, only half of the stator bar mold insert (either 210 or 220) is removed to enable removal of the lug 17 from the mold.

Figure 4:
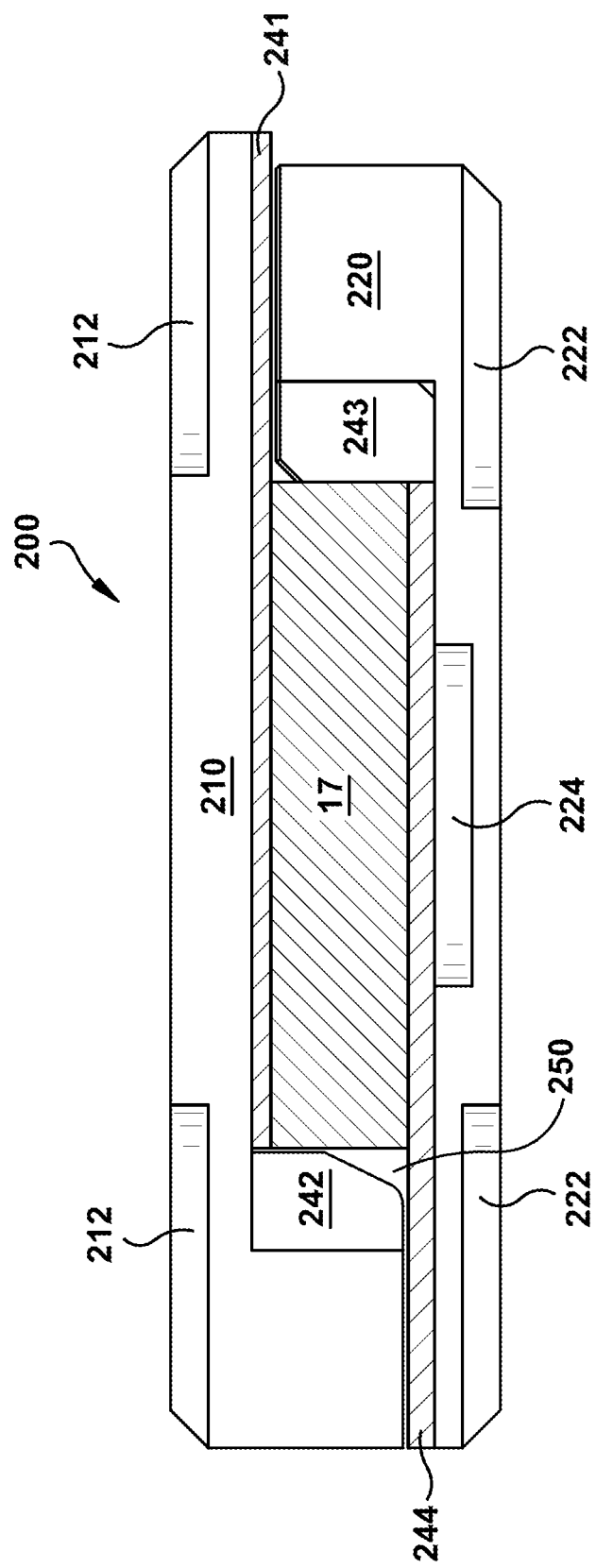
FIG. 4 illustrates an end view of the stator bar mold insert, according to an aspect of the disclosure.

FIG. 4 illustrates an end view of the stator bar mold insert 200, according to an aspect of the disclosure. The lug 17 of stator bar 10 is shown sandwiched between upper portion 210 and lower portion 220, and in this case central cavity 230 is substantially (if not completely) filled by lug 17. As may be seen, excess resin is greatly limited by the close fitting of the lug and low friction layers, so the lug 17 will take very little preparation for brazing to connectors or other lugs. Low friction material layers 241, 242, 243 and 244 make it safer and easier to take the bars 10 (or lugs 17) out of the TVPI mold. This is very beneficial, as damage to the bar in this area (i.e., the lugs 17) during removal from the mold can cause complete scrapping of the bar. The shape of the low friction material layers may also assure at least one resin channel 250. Channel 250 (or another suitable passageway) is provided so that resin may flow to desired areas in the mold or mold insert.

Figure 5:
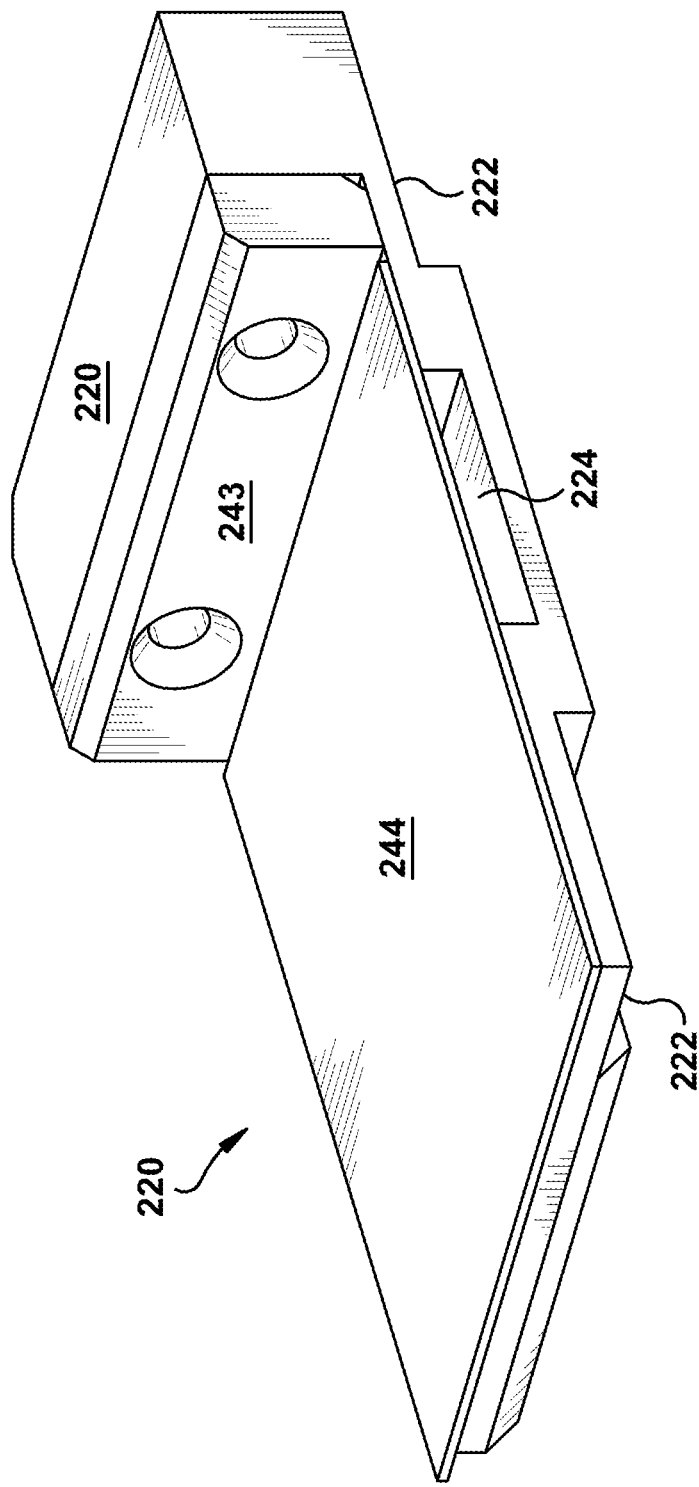
FIG. 5 illustrates a top perspective view of the lower portion of the stator bar mold insert, according to an aspect of the disclosure.

FIG. 5 illustrates a top perspective view of the lower portion 220 of the stator bar mold insert 200, according to an aspect of the disclosure. Low friction material layer 244 may be comprised of a sheet of PTFE, and can be simply laid in place. Low friction material layer 243 may be attached to lower portion 220 via fasteners (e.g., screws, bolts) passing through the illustrated holes.

A technical advantage of the present disclosure is that stator bar lugs and stator bar mold inserts may be easily removed from molds without damage thereto (or with greatly reduced damage), and damage to the stator bar mold insert is also reduced, minimized or eliminated. It is also to be understood that the upper and lower portions and central cavity may have non-rectangular or non-L shapes, if the lug and/or bar design has a specific shape. As one example only, if the lugs have an oval cross-sectional shape, then the central cavity would also have a similar oval cross-sectional shape. The upper and lower portions may also have specific shapes to fit appropriately in the stator bar mold. The stator bar mold insert is shaped in a complimentary way to fit into the stator bar mold. Further, the low friction material layers/pieces may vary from 1 to any number greater than 1, as desired in the specific application, as long as the lug is completely surrounded.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. The term, "substantially" is defined as, of ample or considerable amount, quantity, size, etc. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A stator bar mold insert comprising:
    an upper portion;
    a lower portion;
    a central cavity disposed between and defined by the upper portion and the lower portion, the central cavity configured for use with a stator bar;
    a low friction material lining the central cavity, the low friction material substantially surrounding the stator bar located inside the stator bar mold insert; and
    wherein the lower portion comprises a body having an inside surface facing towards the central cavity, the inside surface comprising a recess facing towards the central cavity, the recess facilitating removal of the stator bar and the low friction material from the stator bar mold insert.

2. The stator bar mold insert of claim 1, the upper portion comprised of a generally L-shaped body, an inside surface of the L-shaped body facing towards the central cavity; and
    wherein the low friction material is attached to the inside surface of the L-shaped body.

3. The stator bar mold insert of claim 2, the low friction material comprised of a first low friction material piece and a second low friction material piece;
    wherein the first low friction material piece and the second low friction material piece cover substantially the entire inside surface of the L-shaped body.

4. The stator bar mold insert of claim 3, wherein the low friction material is comprised of polytetrafluoroethylene or a synthetic fluoropolymer of tetrafluoroethylene.

5. The stator bar mold insert of claim 1, the upper portion comprising at least one upper recess located on an outside surface of the L-shaped body;
wherein the at least one upper recess facilitates stator bar mold insert removal.

6. The stator bar mold insert of claim 1, the body of the lower portion is generally L-shaped, and
wherein at least a portion of the low friction material is attached to the inside surface.

7. The stator bar mold insert of claim 6, the low friction material comprised of a third low friction material piece and a fourth low friction material piece;
wherein the third low friction material piece and the fourth low friction material piece cover substantially the entire inside surface.

8. The stator bar mold insert of claim 7, wherein the low friction material is comprised of polytetrafluoroethylene or a synthetic fluoropolymer of tetrafluoroethylene.

9. The stator bar mold insert of claim 7, the third low friction material being easily removable from the inside surface of the lower portion, and the fourth low friction material placed over the recess in the inside surface and unattached to the inside surface of the lower portion.

10. The stator bar mold insert of claim 6, the lower portion comprising at least one lower recess located on an outside surface of the L-shaped body;
wherein the at least one lower recess facilitates stator bar mold insert removal.

11. A stator bar mold insert comprising:
an upper portion comprised of a generally L-shaped body;
a lower portion comprised of a generally L-shaped body;
a central cavity disposed between and defined by the upper portion and the lower portion, the central cavity configured for use with a stator bar, an inside surface of the upper portion's L-shaped body facing towards the central cavity, an inside surface of the lower portion's L-shaped body facing towards the central cavity; and
a low friction material lining the central cavity, the low friction material attached to the inside surface of the upper portion, at least a portion of the low friction material attached to the inside surface of the lower portion, the low friction material configured to substantially surround the stator bar located inside the stator bar mold insert; and
wherein the lower portion comprises a recess in the inside surface of the lower portion, the recess facing towards the central cavity, the recess facilitating removal of the stator bar from the stator bar mold insert.

12. The stator bar mold insert of claim 11, the low friction material comprised of a first low friction material piece and a second low friction material piece;
wherein the first low friction material piece and the second low friction material piece cover substantially the entire inside surface of the upper portion, and wherein at least one of the first low friction material piece and the second low friction material piece provide a resin channel.

13. The stator bar mold insert of claim 12, wherein the low friction material is comprised of polytetrafluoroethylene or a synthetic fluoropolymer of tetrafluoroethylene.

14. The stator bar mold insert of claim 13, the upper portion comprising at least one upper recess located on an outside surface of the L-shaped body;
wherein the at least one upper recess facilitates stator bar mold insert removal.

15. The stator bar mold insert of claim 14, the low friction material comprised of a third low friction material piece and a fourth low friction material piece;
wherein the third low friction material piece and the fourth low friction material piece cover substantially the entire inside surface of the lower portion.

16. The stator bar mold insert of claim 15, the lower portion comprising at least one lower recess located on an outside surface of the L-shaped body;
wherein the at least one lower recess facilitates stator bar mold insert removal.

17. The stator bar mold insert of claim 16, the fourth low friction material being easily removable from the inside surface and the fourth low friction material placed over the recess in the inside surface.

18. A stator bar mold insert comprising:
an upper portion comprised of a generally L-shaped body, an inside surface of the L-shaped body facing towards a central cavity;
a lower portion comprised of a second generally L-shaped body, an inside surface of the second generally L-shaped body facing towards the central cavity;
the central cavity disposed between and defined by the upper portion and the lower portion, the central cavity housing a portion of a stator bar; and
a low friction material lining the central cavity, the low friction material configured to substantially surround the stator bar located inside the stator bar mold insert, the low friction material providing a resin channel, and wherein the low friction material is comprised of polytetrafluoroethylene or a synthetic fluoropolymer of tetrafluoroethylene; and
wherein the lower portion comprises at least one recess located on an outside surface of the L-shaped body, the at least one recess facilitating stator bar mold insert removal, the lower portion comprising a second recess in an inside surface of the second generally L-shaped body, the second recess facing towards the central cavity, wherein the second recess facilitates removal of the stator bar from the stator bar mold insert.

19. The stator bar mold insert of claim 18, the upper portion comprising at least one upper recess located on an outside surface of the L-shaped body, the at least one upper recess facilitating stator bar mold insert removal.

* * * * *